United States Patent [19]

Yamauchi et al.

[11] Patent Number: 4,553,330

[45] Date of Patent: Nov. 19, 1985

[54] MICROMETER

[75] Inventors: Mineo Yamauchi; Yoshimitu Karahashi, both of Kawasaki, Japan

[73] Assignee: Mitutoyo Mfg. Co., Ltd., Tokyo, Japan

[21] Appl. No.: 557,767

[22] Filed: Dec. 2, 1983

[30] Foreign Application Priority Data

Dec. 20, 1982 [JP] Japan .................................. 57-223582
Dec. 20, 1982 [JP] Japan ........................... 57-192757[U]

[51] Int. Cl.$^4$ ................................................ G01B 3/18
[52] U.S. Cl. .................................. 33/164 R; 33/164 C
[58] Field of Search ............ 33/164 R, 164 C, 164 D, 33/165, 166, 167, 147 K

[56] References Cited

U.S. PATENT DOCUMENTS

| 2,075,754 | 3/1937 | Williams | 33/164 R |
| 2,826,820 | 3/1958 | Zelnick | 33/164 C |
| 2,979,826 | 4/1961 | Zabler et al. | 33/164 R |
| 3,101,551 | 8/1963 | Bryant | 33/164 C |

FOREIGN PATENT DOCUMENTS 1218028  1/1971  United Kingdom .............. 33/164 C Primary Examiner—Willis Little
Attorney, Agent, or Firm—Flynn, Thiel, Boutell & Tanis

[57] ABSTRACT

A micrometer wherein two or more spindles are disposed on one and the same axis, a spindle in contact with a workpiece to be measured is made unrotatable and a thimble is reduced in diameter.

This micrometer comprising a main body (1, 101), a first spindle (15) threadably coupled to the main body and integrally rotatably connected to the thimble (17) and a second spindle (46, 146) connected to the first spindle (15) through a connecting mechanism (70, 150), the connecting mechanism (70, 150) including a contact member (61, 161) and a bearing (53, 153) for transmitting only the axial movement of the first spindle (15) to the second spindle (46, 146).

16 Claims, 6 Drawing Figures 4,553,330

MICROMETER

BACKGROUND OF THE INVENTION

1. Field of the Invention

This invention relates to a micrometer for measuring dimensions of a workpiece to be measured such as a length, thickness and the like from a displacement of a spindle.

2. Description of the Prior Art

Heretofore, the commonest micrometer has been a so-called screw feed type micrometer in which a portion of an inner sleeve affixed to a main body is internally threaded with high accuracies, a portion of a spindle externally threaded with high accuracies is threadably coupled to the internally threaded portion, and the spindle is rotated by a thimble integrally affixed to the spindle, to thereby carry out the measurement of a workpiece to be measured. The screw feed type micrometer of the type described is advantageous in that the micrometer has high dust-excluding characteristics because the inner construction including threaded portions of the micrometer is substantially fully closed, and the clamped state of the workpiece can be secured due to the self-locking action of the threaded portions. However, since the spindle as a whole is integrally rotated by the rotation of the thimble, the forward end of the spindle rotates during measuring operation. Thus, when a material high in flexibility such as a non-rigid plastics plate is measured, wrinkles and the like are caused to the workpiece, thereby proving to be unsuitable for the measurement of the aforesaid material. In the micrometer of the type described, when the materials not only the flexible material described above but also other materials are measured, the forward end portion of the rotating spindle comes into contact with the workpiece, whereby wear is caused to the workpiece as well as the spindle a torsional force acting on the workpiece is generated from the spindle, so that the micrometer has not been desirable for maintaining the measurement with high accuracies.

Now, there have been proposed so-called linear type micrometers having various constructions, wherein even if the thimble is rotated, the spindle is displaced without rotation. However, the micrometer of the type described are so complicated in construction that, for example, an intermediate cylindrical member is provided between the spindle and the thimble, further, frictionally engaging means and spring biasing means are provided and so on. Particularly, the fact that such a complicated mechanism must be incorporated in the thimble results in an increased diameter of the thimble, so that the complicated construction has not been suitable for the micrometer generally being compact in size and requiring one-hand operation.

SUMMARY OF THE INVENTION

The object of the present invention is to provide a linear type micrometer having a simplified construction, wherein the diameter of a thimble can be reduced in particular.

To this end, the present invention contemplates that a spindle, which has commonly consisted of a shaft member, is composed by a first spindle and a second spindle, which are arranged in an axial direction, a thimble is affixed to the first spindle which is threadably coupled to a main body in a manner to be movable in the axial direction thereof, the second spindle is locked in rotation against and supported by the main body in a manner to be movable in the axial direction thereof, and further, the first and the second spindles are connected to each other through a connecting mechanism in a manner to be rotatable relative to each other and not separable from each other, whereby rotation of the thimble causes the first spindle to move in the axial direction thereof while rotating relative to the main body, however, this axial movement accompanied with rotation of the first spindle is imparted to the second spindle as an axial movement not accompanied with rotation.

DETAILED DESCRIPTION OF THE PREFERRED EMBODIMENTS

Description will hereunder be given of the embodiments of the present invention with reference to the drawings.

Figure 1:
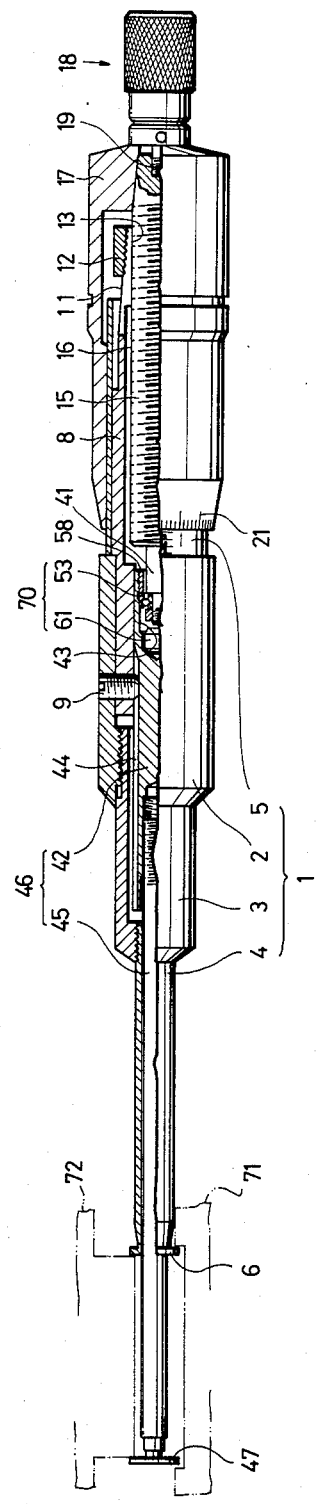
FIG. 1 is a front view, partially cut away, showing the general arrangement of a first embodiment of the micrometer according to the present invention.

FIG. 1 shows the general arrangement of the first embodiment of the micrometer according to the present invention. Referring to the drawing, a main body 1 comprises: a large tubular portion 2; a small tubular portion 3 threadably, solidly secured to the forward end portion (in the left end in the drawing) of the large tubular portion 2 and smaller in diameter than the large tubular portion 2; a cylinder-shaped extended tube 4 threadably, solidly secured to the forward end portion of the small tubular portion 3, being comparatively long and further smaller in diameter than the small tubular portion 3, and a cylinder-shaped outer sleeve 5 solidly secured to the right end edge in the drawing of the large tubular portion 2 through bonding or the like and having an outer diameter substantially equal to the large tubular portion 2.

Figure 2:
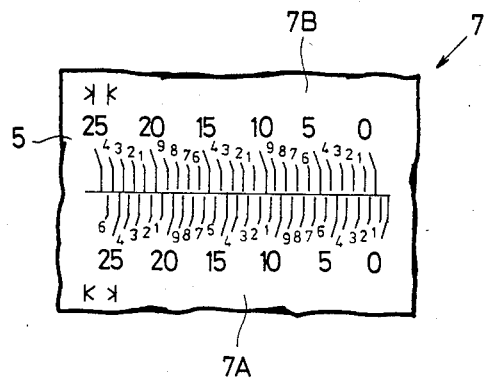
FIG. 2 is an enlarged front view showing the graduated portion of the above embodiment.

Provided at the outer peripheral edge of the forward end of the extended tube 4 is a flange-shaped stationary element 6 directed in a direction perpendicular to the center axis of the main body 1 and having a predetermined thickness, and, as enlargedly shown in FIG. 2, formed on the outer peripheral surface of the outer sleeve 5 is a sleeve graduation 7 as being a graduated portion showing both an internal dimension and an external dimension, respectively.

A cylinder-shaped inner sleeve 8 is inserted through the outer sleeve 5 and the large tubular portion 2, and the inner sleeve 8 is locked in rotation against the large tubular portion 2 by a set-screw 9 threadably coupled to the inner sleeve 8 through a side surface of the large tubular portion 2. In addition, the forward end of the set-screw 9 is projected inwardly by a predetermined value from the inner peripheral surface of the inner sleeve 8. The other end of the inner sleeve 8 is further extended rightwardly in the drawing from the right end portion of the outer sleeve 5, and a slot 11 is formed at the aforesaid end portion. Furthermore, a tapered nut 12 is threadably coupled onto this end portion, so that the inner diameter of a portion 13 internally threaded with high accuracies on the inner peripheral surface of this end portion can be adjusted in accordance with a threadably coupled position of the tapered nut 12.

Threadably coupled to the internally threaded portion 13 is a portion 16 externally threaded with high accuracies over the substantially entire length of the outer peripheral surface of a first spindle 15, and the both threaded portions 13 and 16 are threadably coupled with high accuracies to each other with no looseness and the like through the clamping adjustment of the tapered nut 12. Taperedly coupled to the right end of the first spindle 15 is a thimble 17 which is solidly secured to the first spindle 15 through a screw 19 constituting a part of a knob 18. Furthermore, the thimble 17 slidably surrounds the outer sleeve 5, the left end edge of the thimble 17 in the drawing is constantly positioned on the outer periphery of the outer sleeve 5 regardless of a threadably coupled position of the first spindle 15 and the inner sleeve 8, and a thimble graduation 21 is formed on the peripheral surface of the left end edge portion.

Figure 3:
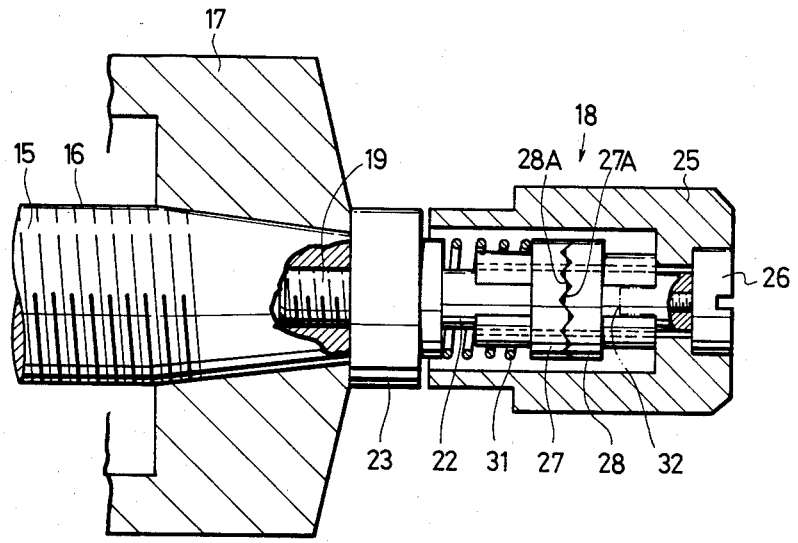
FIG. 3 is a sectional view showing the inner construction of the knob in the above embodiment.

As enlargedly shown in FIG. 3, the knob 18 has a flange 23 projectingly provided at one side surface thereof with the screw 19. The flange 23 is projectingly provided at the other end thereof with a center shaft 22 disposed on the same axis as the screw 19 and directed in a direction opposite to the screw 19. A small cylinder-shaped and bottomed control head 25 is rotatably coupled onto the center shaft 22, and the control head 25 is locked against dislodging by a mounting screw 26 threadably coupled to the center shaft 22 from the right end in the drawing.

A first and a second ratchet wheels 27 and 28 which function in both the normal and reverse directions are incorporated in the control head 25. Both the ratchet wheels 27 and 28 are formed into crown gears. Gear portions 27A and 28A are formed to provide gears each having an equilateral triangle having a base directed in the rotating directions, and forward end portions of the gears are shorn off flatly in the rotating directions so that the meshing engagement and disengagement during the rotations relative to each other can be facilitated. The first ratchet wheel 27 is rotatably inserted therethrough with the center shaft 22 and biased by a compression coil spring 31 to the right in the drawing. On the other hand, the second ratchet wheel 28 is rotatably inserted therethrough with the center shaft 22, however, locked against dislodging by a projection 32 projecting from the bottom of the inner peripheral surface of the control head 25, and brought into meshing engagement with the first ratchet wheel 27 biased to the right, to thereby be pressed against the bottom of the control head 25. In consequence, when the head 25 is gripped and rotated, the second ratchet wheel 28 is rotated in synchronism with the head 25, normally the rotation is imparted to the first ratchet wheel 27, and then, the rotation is transmitted from the first ratchet wheel 27 to the flange 23 and the thimble 17 (the first spindle 15) through the spring 31. However, if the head 25 is still rotated even when the thimble 17 is brought into an unrotating state, then the gear portions 27A and 28A are disengaged from each other and only the head 25 idlingly rotates, whereby the measuring pressure is maintained at a predetermined value.

A small and substantially round protruding shaft 41 is protruded from the left end portion of the first spindle 15, and this protruding shaft 41 is inserted into a recess 43 formed at the right end in the drawing of the round shaft-like large diameter portion 42 and having a small column-shaped inner peripheral surface. The large diameter portion 42 is slidably inserted into the sleeve 8 (the main body 1), supported by the main body 1 in a manner to be movable on the same axial line as the first spindle 15, formed at a side surface thereof with a rotation-locking groove 44 in the longitudinal direction thereof, and the forward end portion of the set-screw 9 is slidably coupled into this rotation-locking groove, whereby the large diameter portion 42 is locked against rotation.

Threadably coupled and fixed into the forward end of the large diameter portion 42 is the proximal end of a comparatively long and round-shaft shaped small diameter portion 45 slidably inserted through the extended tube 4, whereby the large diameter portion 42 and the small diameter portion 45 constitute a second spindle 46 generally being of an outer shape of a stepped and round shaft-shaped member. Furthermore, the forward end portion of the small diameter portion 45 protrudes from the forward end of the extended tube 4 and a flange-shaped movable element 47 constructed substantially similar to the stationary element 6 is provided around the outer periphery of the forward end of the small diameter portion 45.

Figure 4:
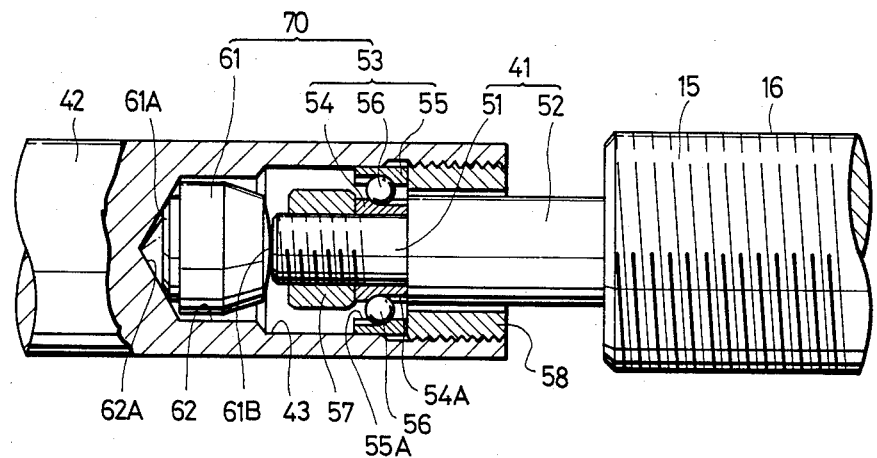
FIG. 4 is a sectional view enlargedly showing the connecting mechanism in the above embodiment.

As enlargedly shown in FIG. 4, the protruding shaft 41 is formed into a stepped and round shaft-shaped member including a small diameter portion 51 at the forward end portion and a large diameter portion 52 at the proximal end portion and a bearing 53 is coupled to a stepped portion. The bearing 53 comprises an inner race 54, an outer race 55 and a plurality of turning balls 56 interposed between the both races 54 and 55. The inner race 54 is formed with a comparatively deep retainer groove 54A being in contact with the left sides of the outer peripheral surfaces of the turning balls 56 for positively retaining the turning balls, while, the outer race 55 is also formed with a comparatively deep retainer groove 55A being in contact with the left sides of the outer peripheral surfaces of the turning balls 56 for positively retaining the turning balls, whereby the turning balls 56 are satisfactorily positively retained between the both grooves 54A and 55A in a manner to be rotatable and held in not only the vertical direction but also the lateral direction. In addition, present intervals in the circumferential direction are maintained between the respective turning balls 56 by a retainer, not shown.

The inner race 54 is clampedly fixed between the stepped portion of the protruding shaft 41 and a nut 57 threadably coupled onto the small diameter portion 51 from the forward end thereof. The outer race 55 is supported at the outer peripheral surface thereof by the inner peripheral surface of the recess 43, and a keep ring 58 being inserted therethrough with the large diameter portion 52 is in contact with the right end edge of the outer race 55.

The forward end of the small diameter portion 51 is formed into a flat surface portion perpendicular to the axial direction of the first spindle 15 and this flat surface portion is finished with high accuracies to be very smooth. Furthermore, this flat surface portion is in contact with a contact member 61 held by the large diameter portion 42 of the second spindle 46.

The contact member 61 is formed into a substantially short column-shape and rotatably held in a coupling hole 62 formed at the bottom of the recess 43. The bottom of the coupling hole 62 is formed into a conically tapered surface 62A having a vertex positioned on the axis of the second spindle, and the contact member 61 is formed at an end face thereof with a tapered portion 61A to be in contact with this tapered surface 62A, so that the contact member 61 can be accurately positioned on the aforesaid axis by the tapered surface 62A and the tapered portion 61A. Furthermore, a contact surface 61B of the contact member 61, which comes into contact with the small diameter portion 51, is formed into a spherical surface finished with high accuracies to be very smooth. The contact member 61 is rotatably brought into point-to-point contact with the flat surface portion, and this contact point is positioned on the axis common to the both spindles 15 and 46.

Here, the bearing 53 and the contact member 61 constitute a connecting mechanism 70 for connecting both of the spindles 15 and 46 in a manner to be rotatable relative to and inseparable from each other. Furthermore, the sleeve graduation 7 (Refer to FIG. 2) possesses together an inner dimension measuring graduation 7A and an outer dimension measuring graduation 7B, and these graduations 7A and 7B are shifted from each other in the axis common to the both spindles 15 and 46 by a distance corresponding to a sum of the thicknesses of the flange-shaped stationary element 6 and the flange-shaped movable element 47.

Description will hereunder be given of action of this embodiment.

Now, the knob 18 (thimble 17) is rotated in a predetermined direction, i.e., in the counterclockwise direction in looking from the right end in the conditions shown in FIG. 1, whereby the threadably coupled position between the first spindle 15 and the inner sleeve 8 is displaced to the right, so that the first spindle 15, rotating, moves to the right. When the first spindle 15 rotatingly moves, the inner race 54 of the bearing 53 affixed to the protruding shaft 41 provided at the forward end of the first spindle 15 rotatingly moves to the right simultaneously with the first spindle 15. Since the turning balls 56 interposed between the inner and outer races 54 and 55 are in the conditions where the turning balls are rotatably clamped by the both retainer grooves 54A and 55A from opposite sides in the drawing, the outer race 55 also moves to the right along with the rightward movement of the inner race 54. However, the second spindle 46, being locked against rotation by the set-screw 9 and the rotation-locking groove 44, moves to the right as in the rotation-locked state, i.e., linearly to the right. Thus, the first spindle 15 rotatingly moves, while the second spindle 46 unrotatingly, linearly moves. In this case, the movements of the spindles 15 and 46 are very smoothly effected through the rotation of the turning balls 56 interposed between the both races 54 and 55.

Furthermore, when the knob 18 is rotated in a direction opposite to the above, the first spindle 15, rotating, moves to the left.

The flat surface portion at the forward end of the protruding shaft 41 provided at the forward end of the first spindle 15 is in point-to-point contact with the vertex portion of the contact surface 61B of the contact member 61, whereby the contact member 61 is pressed by the protruding shaft 41 to move to the left and the second spindle 46 holding the contact member 61 moves to the left along with the leftward movement of the contact member 61. The second spindle 46, being locked against rotation as aforesaid, moves linearly without rotating. In this case, although the contact member 61 itself, being in contact with the forward end of the protruding shaft 41, may rotate, the rotation of the contact member 61 will not adversely affect the measuring accuracy because this contact member 61 is accurately positioned in the coupling hole 62 by the tapered surface 62A and the tapered portion 61A, i.e., the contact member 61 is positioned such that the center position thereof is constantly on the axis common to the both spindles 15 and 46.

When the knob 18 is rotated in the normal or reverse direction as described above, the second spindle 46 is linearly moved to the right or left depending upon the rotating direction, whereby the internal measurement of a workpiece 71 or the external measurement of a workpiece 72 is performed. At this time, the internal dimension is indicated by the inner dimension measuring graduation 7A of the sleeve graduation 7 and the external dimension is indicated by the outer dimension measuring graduation 7B. Here, no matter in what direction the flange-shaped movable element may come in contact with a measuring surface, upon contact only the control head 25 of the knob 18 idlingly rotates through the agency of the both ratchet wheels 27 and 28 incorporated in the knob 18, so that any measuring pressure above a predetermined value of pressure will not be applied to the workpiece 71 or 72.

The above-described embodiment can offer the following advantages.

Since the first and the second spindles 15 and 46 are connected to each other in a manner to be movable relative to and inseparable from each other by the connecting mechanism 70, the first spindle 15 is rotatingly moved by a so-called screw feed system, while the second spindle 46 having the flange-shaped movable element 47 for actually coming into contact with the workpiece 71 or 72 can be linearly moved. In consequence, the measurement with high accuracies can be performed with no rotational force being applied to the workpieces 71 and 72 from the flange-shaped movable element 47. Furthermore, the measurement with high accuracies can be maintained with no possibility of wear between the workpiece 71, 72.

Moreover, the connecting mechanism 70 is provided on the axis common to the both spindles 15 and 46 and has a very simplified construction so that the micrometer as a whole can be rendered compact, and particularly, rendered small in diameter, thereby enabling to offer the advantage of using the micrometer as a groove measuring micrometer which is often inserted into holes and the like.

Furthermore, the retainer grooves 54A and 55A of the both races 54 and 55 of the bearing 53 are formed into comparatively deep grooves, whereby the turning balls 56 are positively held from the opposite sides, so that the movement of the first spindle 15 can be reliably transmitted as the movement of the second spindle 46 only in the axial direction. On the other hand, as for the contact member 61, the contact member 61 is held in the coupling hole 62 in a very accurately positioned state, and moreover, the contact member 61 is constructed such that the protruding shaft 41 is rotatably brought into point-to-point contact with the vertex portion of the contact surface 61B thereof, so that the movement with rotation of the first spindle 15 can be very smoothly and accurately transmitted to the second spindle 46 with no looseness. In other words, a micrometer having outstanding measuring accuracy and controllability can be provided.

Since the inner dimension measuring graduation 7A and the outer dimension measuring graduation 7B are used together, so that the internal dimension measurement and the external dimension measurement can be successively performed by a single micrometer without any conversion, thus improving the measuring operations.

Further, the knob 18 incorporates therein the ratchet mechanism for acting on the rotation in the normal or reverse direction of the knob 18, so that the measuring pressure can be maintained at a predetermined value in either the internal dimension measurement or the external dimension measurement.

Description will now be given of the embodiment other than the above. Same reference numerals are used to designate same or similar parts, so that description can be simplified or dispensed with.

Figure 5:
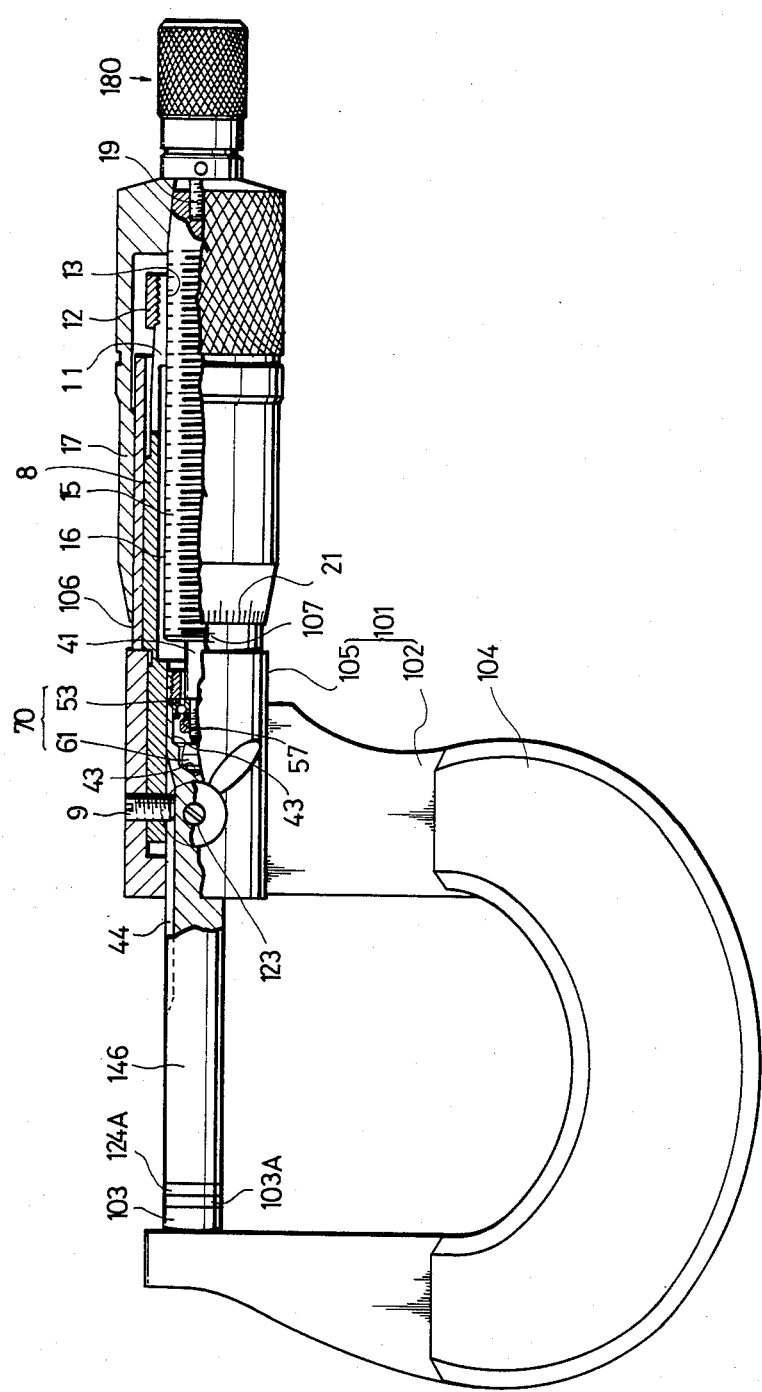
FIG. 5 is a front view, partially cut away, showing the general arrangement of a second embodiment of the micrometer according to the present invention.

FIG. 5 shows the second embodiment of the present invention. Referring to the drawing, one end portion of a main body 101 is formed into a U-shape, an anvil 103 having a carbide tip 103A is affixed to the inner surface of one end of an opening of this U-shaped portion 102, and the U-shaped portion 102 is secured at opposite sides thereof with covers 104. The other end of the main body 101 is formed into a tubular portion 105 disposed laterally in the drawing. This tubular portion 105 is integrally formed on the other end of the U-shaped portion 102.

One end of a cylindrical outer sleeve 106 is solidly secured through bonding to the right end edge in the drawing of the tubular portion 105, and a sleeve graduation 107 is formed on the outer peripheral surface of this outer sleeve 106.

A second spindle 146 supported in the tubular portion 105, the recess 43 of which is inserted with the protruding shaft 41 comprises a round shaft member provided at one end thereof with a carbide tip 124A unlike in the preceding embodiment.

In addition, in this embodiment, it is sufficient that a knob 180 integrally connected to the first spindle 15 incorporates therein a ratchet mechanism idlingly rotates only when the second spindle 146 comes into contact with the workpiece to apply a predetermined value of measuring pressure thereto. Furthermore, designated at reference numeral 123 in the drawing is a clamp screw for clamping the second spindle 146 to the tubular portion 105.

The above-described embodiment is similar in function and effects to the aforesaid first embodiment, and, in addition to the effect of the first embodiment, this embodiment can provide a micrometer rendered compact in size, easily one-hand operated, and excellent in controllability.

In working the present invention, such an arrangement may be adopted that the forward end of the protruding shaft 41 is rotatably brought into direct contact with the second spindle 46 or 146 with no contact member 61 provided. However, the provision of the contact member 61 makes it possible that, in addition to the aforesaid effects, the contact member 61 can be hardened by the hardening process and the like. The bearing 53 may be an ordinary angular type radial bearing, however, the provision of the retainer grooves 54A and 55A constructed such that the comparatively deep grooves clamp the turning balls 56 from the opposite directions on the axis common to the spindles 15, 46 or 146 makes it possible to make the connecting mechanism 70 become very high in mechanical strength. Furthermore, the connecting mechanism 70 need not necessarily be limited to that constituted by the bearing 53 and the contact member 61, and it suffices to use one capable of connecting the first spindle 15 and the second spindle 46 or 146 in a manner to be rotatable relative to and inseparable from each other.

Figure 6:
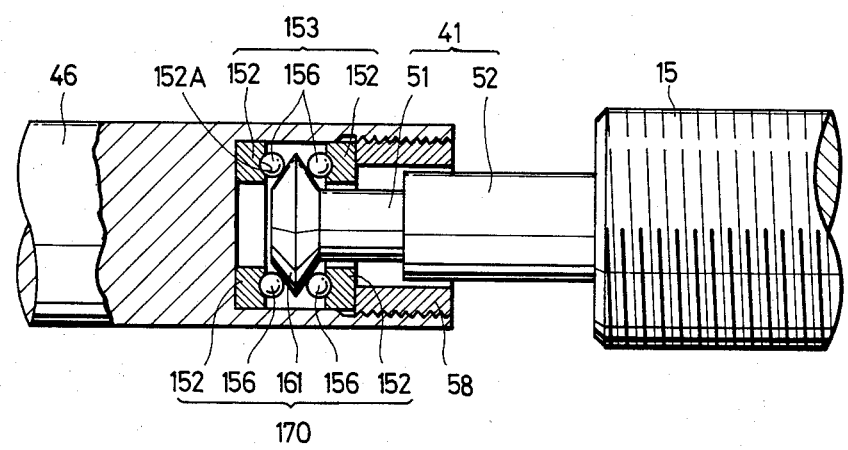
FIG. 6 is a sectional view enlargedly showing a modification of the aforesaid connecting mechanism.

Furthermore, the connecting mechanism 70 has been constituted by the bearing 53 and the contact member 61, however, as shown in FIG. 6 for example, an abacus bead-shaped rotator 161 is integrally formed at the forward end of the protruding shaft 41, races 152 each having a retainer groove 152A are opposed to opposite tapered surfaces of this rotator 161 through a plurality of turning balls 156, respectively, from opposite directions in the drawing, to thereby constitute a bearing 153, whereby a connecting mechanism 170 is constituted by the rotator 161 and the bearing 153, so that the first spindle 15 and the second spindle 46 or 146 may be connected by the connecting mechanism 170 in a manner to be rotatable relative to and inseparable from each other.

As has been described hereinabove, the present invention can provide a linear type micrometer simplified in construction, wherein the thimble can be reduced in diameter in particular.

What is claimed is:

1. A micrometer, comprising:
   a main body;
   a thimble rotatably supported on said main body;
   a first spindle supported for rotation on said main body in response to the rotation of said thimble, said first spindle means being threadably coupled to said main body in a manner to be movable in the axial direction thereof upon rotation thereof;
   a second spindle locked against rotation and axially movably supported on said main body on the same axis as said first spindle; and
   connecting means for connecting said first and second spindles integrally and inseparably to each other in a condition where no axial force is applied to the spindles in either direction, and when said first spindle is rotated and moved in the axial direction thereof, only the axial force of said first spindle is transmitted to said second spindle.

2. A micrometer as set forth in claim 1, wherein said connecting means comprises:
   a contact member taperedly contacting a recess formed in said second spindle adjacent a first end on said first spindle; and
   a protruding shaft extending from said first end;
   a bearing interposed between said protruding shaft and in said recess and being in point-to-point contact at the forward end face thereof with said contact member and said second spindle, for transmitting only the axial movement of said first spindle to said second spindle.

3. A micrometer as set forth in claim 2, wherein said bearing comprises:
   an inner race provided around the outer peripheral surface of said protruding shaft;
   an outer race opposed to said inner race in the inner peripheral surface of said recess; and turning balls interposed between said inner race and said outer race;

said inner race and said outer race being formed thereon with grooves, respectively, for retaining said turning balls, whereby said first spindle and said second spindle are connected in a manner to be inseparable from each other.

4. A micrometer as set forth in claim 1, wherein said connecting means comprises:

a contact member positioned in a recess formed in said second spindle adjacent a first end on said first spindle, a protruding shaft protruding from said first end of said first spindle into said recess and being integrally formed on said first spindle; and a bearing interposed between said contact member and said second spindle.

5. A micrometer as set forth in claim 4, wherein said contact member is formed into a substantially abacus bead shape, the diametral direction of which is directed in a direction perpendicular to the axis of said spindle, and wherein turning balls are interposed between said contact member and a plurality of races provided in the inner peripheral surface of said recess in a manner to clamp the opposite declined surfaces of said contact member from opposite sides, whereby said first spindle and said second spindle are connected inseparably from each other.

6. A micrometer as set forth in claim 1, wherein said main body comprises:

a U-shaped frame provided at one end thereof with a tip; and a tubular member formed on the other end of said frame and supporting therein said second spindle.

7. A micrometer comprising:

a main body provided at the forward end portion thereof with a flange-shaped stationary element;

a first spindle axially movably, threadably coupled to the proximal end of said main body;

a knob incorporating therein a ratchet mechanism acting on the rotation in the normal or reverse direction and secured to said first spindle;

a thimble rotatable integrally with said first spindle;

a second spindle connected to said first spindle through a connecting mechanism in a manner to be rotatable relative to and inseparable from each other, locked against rotation and supported by said main body in a manner to be movable on the axis of said first spindle, and provided on the forward end portion thereof protruded from the forward end of said main body with a flange-shaped movable element; and a graduation portion formed on the outer periphery of said main body, for indicating both the internal dimension and the external dimension, respectively.

8. A micrometer as set forth in claim 7, wherein said ratchet mechanism comprises: a center shaft of said knob; a pair of ratchet wheels fitted onto said center shaft and meshingly engageable with each other; and said ratchet wheels idlingly rotate in either direction when a predetermined value of measuring pressure is applied in either directions of the movement of the spindles.

9. A micrometer as set forth in claim 8, wherein the tooth form of said ratchet wheels is of an equilateral triangle having a base directed in the rotating direction of the ratchet wheels and the forward end of the tooth is shorn off flatly along said rotating direction.

10. A micrometer as set forth in claim 7, wherein said connecting mechanism comprises:

a contact member taperedly contacting a recess formed in said second spindle on the first spindle's side; and a bearing interposed between a protruding shaft extending from one end face of said first spindle to said recess and being in point-to-point contact at the forward end face thereof with said contact member and said second spindle, for transmitting only the axial movement of said first spindle to said second spindle.

11. A micrometer as set forth in claim 10, wherein said bearing comprises: an inner race provided around the outer peripheral surface of said protruding shaft; an outer race opposed to said inner race in the inner peripheral surface of said recess; and turning balls interposed between said inner race and said outer race; said inner race and said outer race being formed thereon with grooves, respectively, for retaining said turning balls, whereby said first spindle and said second spindle are connected in a manner to be inseparable from each other.

12. A micrometer as set forth in claim 7, wherein said connecting mechanism comprises:

a contact member positioned in a recess formed in said second spindle on the first spindle's side, protruding from one end of said first spindle into said recess and integrally formed on said first spindle; and a bearing interposed between said contact member and said second spindle.

13. A micrometer as set forth in claim 12, wherein said contact member is formed into a substantially abacus bead shape, the diametral direction of which is directed in a direction perpendicular to the axis of said spindle, and wherein turning balls are interposed between said contact member and a plurality of races provided in the inner peripheral surface of said recess in a manner to clamp the opposite declined surfaces of said movable member from opposite sides, whereby said first spindle and said second spindle are connected inseparably from each other.

14. A micrometer as set forth in claim 7, wherein said second spindle comprises two round shaft members differing in diameter from each other and connected to each other in a manner to be positioned on one and the same axis.

15. A micrometer as set forth in claim 7, wherein said graduation portion comprises an inner dimension measuring graduation and an outer dimension measuring graduation, which are formed on the outer peripheral surface of an outer sleeve provided along the inner periphery of said thimble and simultaneously written at opposite sides of a base line extending on the outer peripheral surface of said outer sleeve in the axial direction thereof, said both graduations being shifted from each other by a distance corresponding to a sum of the thicknesses of a flange-shaped stationary element and a flanged-shaped movable element.

16. A micrometer comprising:

a main body including a large tubular portion, an outer sleeve affixed to one end of said large tubular portion, a small tubular portion connected to the other end of said large tubular portion and an extended tube affixed to a portion of said small tubular portion opposite to said connected portion and provided at the forward end thereof with a flange-shaped stationary element;

a first spindle axially movably, threadably coupled into an inner sleeve coupled into the inner peripheral surface of said outer sleeve;

a thimble integrally rotatably connected to said first spindle;

a second spindle disposed on the same axis as said first spindle in said main body, including two round shaft members differing in diameter connected to each other and provided at the forward end portion thereof protruding from said extended tube with a flange-shaped movable element brought into contact with a workpiece to be measured in cooperation with said flange-shaped stationary element;

a connecting mechanism including a contact member positioned in a recess formed in said second spindle on said first spindle's side and a bearing for transmitting only the axial movement of said first spindle to said second spindle;

a rotation locking mechanism for locking said second spindle against rotation through a screw threadably coupled into said second spindle by way of said large tubular portion;

an inner and an outer dimension measuring graduations formed at opposite sides of a base line provided on the outer peripheral surface of said outer sleeve in the axial direction of said outer sleeve, said both graduations being shifted from each other by a distance corresponding a sum of the thicknesses of said flange-shaped stationary and movable elements; and a knob affixed to one end of said first spindle and incorporating therein a ratchet mechanism; said ratchet mechanism including a center shaft of said knob, a pair of ratchet wheels fitted onto said center shaft and meshingly engageable with each other and a spring for normally biasing said ratchet wheels in the meshing direction, and said ratchet wheels idlingly rotating with each other when the measuring force given to the workpiece to be measured by said flange-shaped stationary and movable elements exceeds a predetermined value.

* * * * *